US012462458B2

(12) United States Patent
Soares et al.

(10) Patent No.: US 12,462,458 B2
(45) Date of Patent: Nov. 4, 2025

(54) SYSTEMS AND METHODS FOR PROGRAMMATICALLY GENERATING CUSTOM GREETING CARDS

(71) Applicant: YAHOO ASSETS LLC, New York, NY (US)

(72) Inventors: Joao Vitor Baldini Soares, New York, NY (US); Paloma de Juan, New York, NY (US)

(73) Assignee: YAHOO ASSETS LLC, New York, NY (US)

(*) Notice: Subject to any disclaimer, the term of this patent is extended or adjusted under 35 U.S.C. 154(b) by 150 days.

(21) Appl. No.: 18/488,618

(22) Filed: Oct. 17, 2023

(65) Prior Publication Data
US 2025/0124624 A1    Apr. 17, 2025

(51) Int. Cl.
G06F 3/048       (2013.01)
G06F 3/0482      (2013.01)
G06T 11/60       (2006.01)
H04L 51/07       (2022.01)

(52) U.S. Cl.
CPC ............ *G06T 11/60* (2013.01); *G06F 3/0482* (2013.01); *H04L 51/07* (2022.05); *G06T 2200/24* (2013.01)

(58) Field of Classification Search
None
See application file for complete search history.

(56) References Cited

U.S. PATENT DOCUMENTS

| | | | |
|---|---|---|---|
| 2015/0040031 A1* | 2/2015 | Lee | G06F 3/04842 715/748 |
| 2022/0068296 A1* | 3/2022 | Wilson | G06T 13/205 |
| 2024/0273796 A1* | 8/2024 | Edson | G06T 13/00 |
| 2025/0007992 A1* | 1/2025 | Dasher | H04L 67/535 |
| 2025/0014245 A1* | 1/2025 | Xu | G06T 11/60 |

* cited by examiner

*Primary Examiner* — Thanh T Vu
(74) *Attorney, Agent, or Firm* — James J. DeCarlo; Greenberg Traurig, LLP (57) ABSTRACT

In some implementations, the techniques described herein relate to a method including: (i) receiving, by a processor that executes a digital messaging application, an image that comprises a depiction of a user, (ii) selecting, by the processor, an event theme, (iii) creating, by a generative machine learning model, a generated image that comprises the depiction of the user and the event theme, and (iv) transmitting, by the processor, the generated image to one or more digital contacts of the user via the digital messaging application.

20 Claims, 5 Drawing Sheets

SYSTEMS AND METHODS FOR PROGRAMMATICALLY GENERATING CUSTOM GREETING CARDS

BACKGROUND

Greeting cards for seasonal holidays and other events are a long-held and popular tradition. Such cards are often customized with pictures of the sender or their family, images relating to the event, and the like. This tradition has moved from the physical into the digital with many people sending virtual greeting cards with various themes. However, creating a custom greeting card can be time-consuming, especially for users with limited technical skills who may not be proficient with image editing tools.

DETAILED DESCRIPTION

The instant disclosure describes systems and methods for programmatically generating custom greeting cards. Various machine learning (ML) models are capable of generating images. One example of such a model is a generative ML model. Generative ML models, often underpinned by Generative Adversarial Networks (GANs) or diffusion models as well as text-based transformer models, are trained on massive datasets of images and text prompts and can be used to generate images of various sizes and styles in response to text and/or image-based prompts. Generative ML models are typically composed of a neural network with many parameters (typically billions of weights or more). For example, a generative ML model may use a GAN to analyze training data and/or image inputs. In some implementations, a generative ML model may use multiple neural networks working in conjunction.

The example embodiments herein describe methods, computer-readable media, device, and systems that programmatically generate greeting cards based on an event theme and incorporating an image of the user. In some examples, the systems described herein may automatically identify an event theme based on calendar, location, user history, and/or other such factors while in other examples, the systems described herein may receive an event theme selection from a user. In some implementations, the systems described herein may incorporate additional personalization such as pictures of users' friends or pets into the greeting card.

In some implementations, the techniques described herein relate to a method including: (i) receiving, by a processor that executes a digital messaging application, an image that comprises a depiction of a user, (ii) selecting, by the processor, an event theme, (iii) creating, by a generative machine learning model, a generated image that comprises the depiction of the user and the event theme, and (iv) transmitting, by the processor, the generated image to one or more digital contacts of the user via the digital messaging application.

In some implementations, the techniques described herein relate to a method wherein selecting the event theme comprises presenting the user with a predetermined list of event themes and receiving a selection from the predetermined list of event themes from the user.

In some implementations, the techniques described herein relate to a method wherein selecting the event theme comprises identifying an activity history of the user and determining the event theme based on the activity history of the user.

In some implementations, the techniques described herein relate to a method wherein selecting the event theme comprises identifying a geographic location of the user and determining the event theme based at least in part on the location of the user.

In some implementations, the techniques described herein relate to a method wherein selecting the event theme comprises identifying, by the processor, a current date, determining, by the processor, an event in close temporal proximity to the current date, and selecting the event theme to match the event.

In some implementations, the techniques described herein relate to a method wherein the generated image comprises text that is relevant to the event theme.

In some implementations, the techniques described herein relate to a method wherein the text comprises a seasonal greeting.

In some implementations, the techniques described herein relate to a method wherein creating, by the generative machine learning model, the generated image comprises retrieving at least one detail relevant to the one or more digital contacts and creating the generated image based at least in part on the at least one detail.

In some implementations, the techniques described herein relate to a method creating, by the generative machine learning model, the generated image comprises automatically retrieving at least one additional image associated with the user that is stored in a user account associated with the digital messaging application and creating the generated image based on the image that comprises the depiction of the user, the event theme, and the at least one additional image associated with the user.

In some implementations, the techniques described herein relate to a method creating, by the generative machine learning model, the generated image comprises transmitting instructions by the processor to the generative machine learning model via an application programming interface.

In some implementations, the techniques described herein relate to a method wherein receiving, by the processor that executes the digital messaging application, the image that comprises the depiction of the user comprises causing display of a user interface element within a user interface of the digital messaging application that prompts the user to create an event-themed image and receiving the image that comprises the depiction of the user via the user interacting with the user interface element.

In some implementations, the techniques described herein relate to a non-transitory computer-readable storage medium for tangibly storing computer program instructions capable of being executed by a computer processor, the computer program instructions defining steps of: (i) receiving, by a processor that executes a digital messaging application, an image that comprises a depiction of a user, (ii) selecting, by the processor, an event theme, (iii) creating, by a generative machine learning model, a generated image that comprises the depiction of the user and the event theme, and (iv) transmitting, by the processor, the generated image to one or more digital contacts of the user via the digital messaging application.

In some implementations, the techniques described herein relate to a non-transitory computer-readable storage medium wherein selecting the event theme comprises presenting the user with a predetermined list of event themes and receiving a selection from the predetermined list of event themes from the user.

In some implementations, the techniques described herein relate to a non-transitory computer-readable storage medium wherein selecting the event theme comprises identifying an activity history of the user and determining the event theme based on the activity history of the user.

In some implementations, the techniques described herein relate to a non-transitory computer-readable storage medium wherein selecting the event theme comprises identifying a geographic location of the user and determining the event theme based at least in part on the location of the user.

In some implementations, the techniques described herein relate to a non-transitory computer-readable storage medium wherein selecting the event theme comprises identifying, by the processor, a current date, determining, by the processor, an event in close temporal proximity to the current date, and selecting the event theme to match the event.

In some implementations, the techniques described herein relate to a non-transitory computer-readable storage medium wherein the generated image comprises text that is relevant to the event theme.

In some implementations, the techniques described herein relate to a non-transitory computer-readable storage medium wherein the text comprises a seasonal greeting.

In some implementations, the techniques described herein relate to a non-transitory computer-readable storage medium wherein creating, by the generative machine learning model, the generated image comprises retrieving at least one detail relevant to the one or more digital contacts and creating the generated image based at least in part on the at least one detail.

In some implementations, the techniques described herein relate to a device including: a processor; and a storage medium for tangibly storing thereon logic for execution by the processor, the logic including instructions for: (i) receiving, by the processor that executes a digital messaging application, an image that comprises a depiction of a user, (ii) selecting, by the processor, an event theme, (iii) creating, by a generative machine learning model, a generated image that comprises the depiction of the user and the event theme, and (iv) transmitting, by the processor, the generated image to one or more digital contacts of the user via the digital messaging application.

Figure 1:
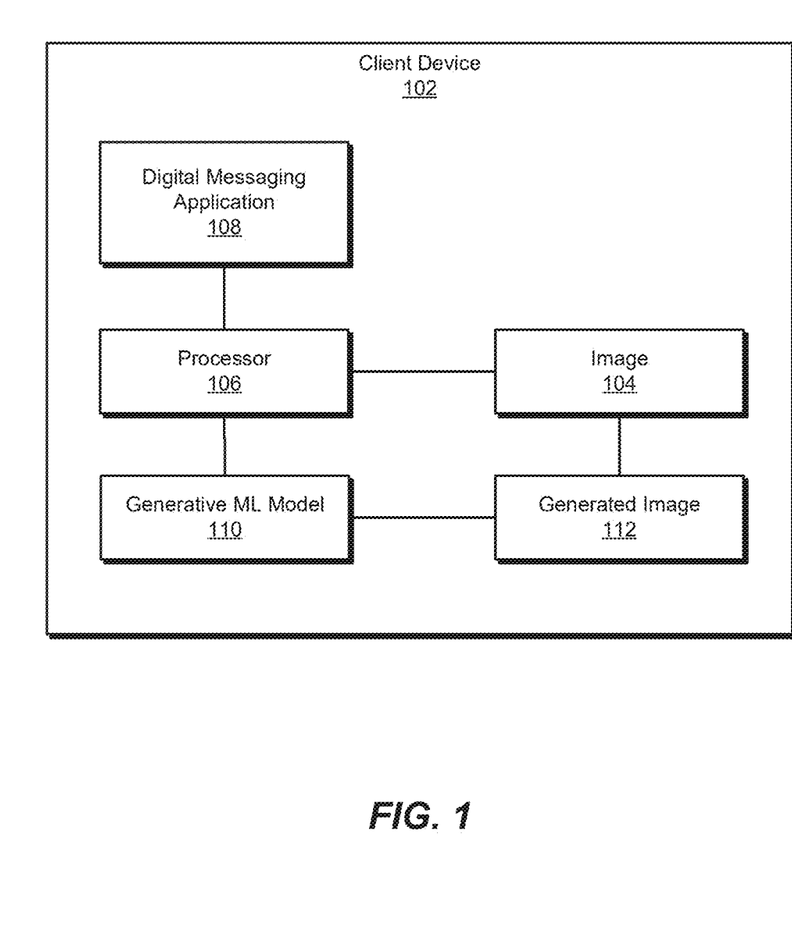
FIG. 1 is a block diagram illustrating a system for programmatically generating custom greeting cards according to some of the example embodiments.

FIG. 1 is a block diagram illustrating a system for programmatically generating custom greeting cards according to some of the example embodiments.

The illustrated system includes a client device 102. Client device 102 may receive, by a processor 106 that executes a digital messaging application 108, an image 104 that comprises a depiction of a user. Processor 106 may select an event theme and generative ML model 110 may create a generated image 112 that comprises the depiction of the user and the event theme. Processor 106 may then transmit generated image 112 to one or more digital contacts of the user via digital messaging application 108. Although illustrated here on client device 102, any or all of the systems described herein may be hosted by one or more servers and/or cloud-based processing resources. Further details of these components are described herein and in the following flow diagrams.

In the various implementations, client device 102, processor 106, digital messaging application 108, and generative ML model 110 can be implemented using various types of computing devices such as laptop/desktop devices, mobile devices, server computing devices, etc. Specific details of the components of such computer devices are provided in the description of FIG. 5 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the method described in FIG. 2.

In some implementations, image 104 can comprise any type of digital image that includes a depiction of the user. In some examples, image 104 may be a photograph of the user. Alternatively, image 104 may be a drawing, cartoon, avatar, or other created and/or generated image of the user. In some examples, image 104 may be stored locally on a user's device. Additionally, or alternatively, image 104 may be stored in online storage for a user's account with the digital messaging application or an associated service (e.g., an associated social media platform).

In some implementations, digital messaging application 108 can comprise any type of applications, service, and/or platform that enables users to send digital messages to one another. In one implementation, digital messaging application 108 may include an email service. In some implementations, digital messaging application 108 may include additional non-messaging features such as image storage, social media, etc.

Figure 2:
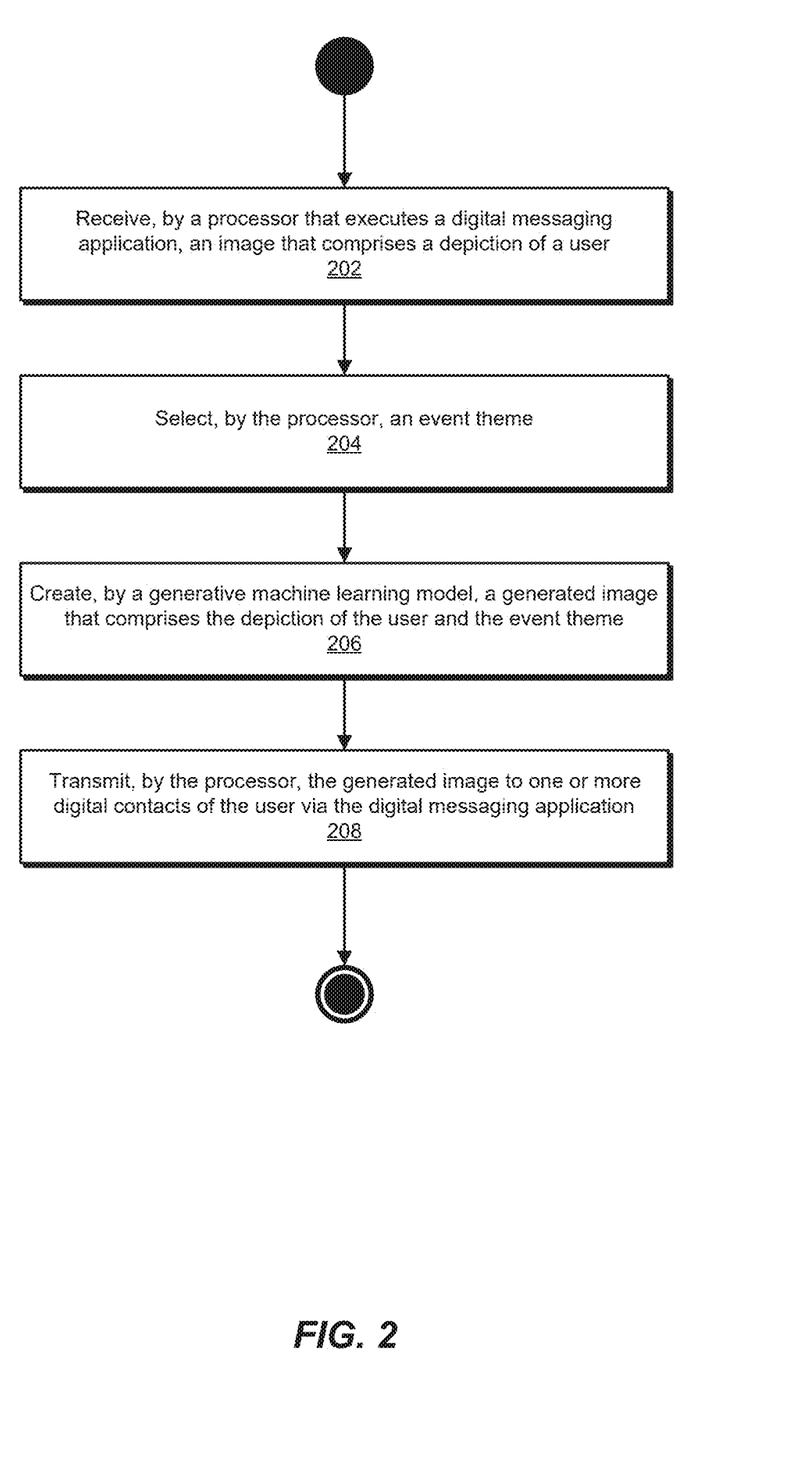
FIG. 2 is a flow diagram illustrating a method for programmatically generating custom greeting cards according to some of the example embodiments.

FIG. 2 is a flow diagram illustrating a method for programmatically generating custom greeting cards according to some of the example embodiments.

In step 202, the method can include receiving, by a processor that executes a digital messaging application, an image that comprises a depiction of a user.

Figure 3:
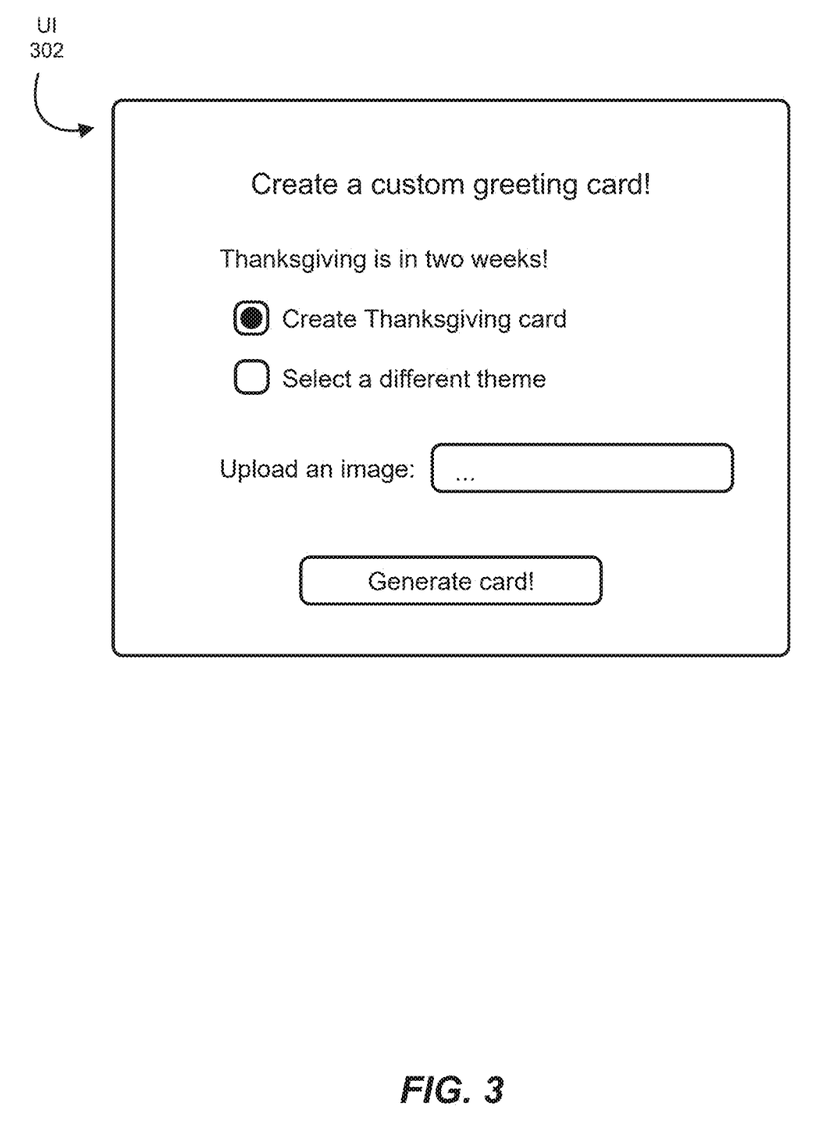
FIG. 3 is an illustration of an example user interface for programmatically generating custom greeting cards according to some of the example embodiments.

The processor may receive the image in a variety of ways and/or contexts. For example, the processor may receive an image uploaded by the user in response to a prompt from the processor. For example, as illustrated in FIG. 3, the systems described herein may display a user interface (UI) 302 that prompts the user to upload an image to be made into a custom greeting card. In one implementation, UI 302 may be part of the digital messaging application. For example, the systems described herein may detect that a user is sending or reading a message related to an event and may suggest generating a custom greeting card. Additionally, or alternatively, the systems described herein may detect that a holiday or other event is approaching (e.g., is two weeks or less away, is one week or less away, etc.) and may display UI 302 and/or a UI button that displays UI 302 when interacted with (e.g., clicked or tapped). In some implementations, a button for displaying UI 302 may always be available in the digital messaging application regardless of the date and/or context.

In some examples, the processor may retrieve the image from local and/or remote storage. For example, the processor may retrieve an image stored locally on a mobile device executing the digital messaging application. In another example, the processor may retrieve an image stored remotely on a cloud server that stores images associated with a user account for the digital messaging application. In some implementations, the systems described herein may display a UI that enables a user to browse stored images. For example, the systems described herein may display a UI that enables a user to browse all images associated with their user account. In some implementations, the systems described herein may determine the images most likely to be relevant based on tags, metadata, analysis (e.g., via a facial recognition algorithm), captions, etc., and may display the relevant images to the user in the UI. Additionally, or alternatively, the systems described herein may automatically retrieve the image. For example, the systems described herein may identify a recent image of the user (e.g., via date metadata and facial recognition) stored either locally or remotely in association with the user's account and may automatically retrieve this image.

Returning to FIG. 2, in step 204, the method can include selecting, by the processor, an event theme.

In some implementations, step 204 may happen prior to step 202 rather than subsequently and the processor may select the event theme prior to receiving the image. For example, the systems described herein may identify an upcoming event (e.g., a holiday, a social event, etc.) and, in response, may prompt a user to create a greeting card. In one example, the systems described herein may identify that Thanksgiving is soon and may display a prompt such as UI 302 in FIG. 3 suggesting that the user create a Thanksgiving card or select a different theme.

The processor may select the event theme in a variety of ways. An event theme may be a holiday (e.g., a civic or religious holiday), a personal event (e.g., a birthday, an anniversary, etc.), a social event (e.g., a sporting event, a party, etc.), and/or any other relevant type of event. In one example, the systems described herein may use information about the current date and/or the user's geographic location to identify an upcoming holiday that the user likely celebrates. For example, the systems described herein may determine that during late June, an American may be planning a celebration for the 4$^{th}$ of July. In another example, the systems described herein may use information from a user's digital messages, activity history, and/or calendar to select an event theme. For example, if the user's calendar shows an upcoming event of "soccer game," the user's recent searches are for soccer-related items, and/or the user's digital messages include messages about an upcoming soccer game, the systems described herein may select an event theme of "soccer game."

In some implementations, the processor may solicit an event theme selection from a user. For example, the processor may display a UI with a predetermined list of event themes (e.g., via a dropdown menu, radio buttons, etc.) and may receive a selection of event theme from the user via the UI. In another example, the processor may display a chat window and enable the user to input an event theme suggestion in natural language. For example, the processor may receive, via the chat window, user input of "make a card for my upcoming family vacation to Costa Rica" and may parse this into the event theme of "tropical vacation." In some implementations, the method may parse the user input via a large language model (LLM).

Returning to FIG. 2, in step 206, the method can include creating, by a generative ML model, a generated image that comprises the depiction of the user and the event theme.

The systems described herein may generate a variety of types of images. For example, the systems described herein may generate a static image. In another example, the systems described herein may generate an animated image. In some examples, the systems described herein may not alter the depiction of the user, while in other examples, the systems described herein may cartoonify the depiction, modify the color palette or lighting, and/or otherwise change the style of the depiction to match with the rest of the generated image. Some of all of these variations may be controllable by varying the terms of a prompt that can be used to guide the generate ML model during image generation.

In some implementations, the systems described herein may preprocess the image before providing the processed image to the generative ML model. For example, the systems described herein may isolate the image of the user and/or other relevant features (e.g., the user's family) from the image and send the isolated regions of the image to the generative ML model. In some implementations, a generative ML model can be used for such pre-processing while, in others, more traditional image processing models can be used (e.g., convolutional neural networks, etc.).

In some implementations, the systems described herein may generate a prompt for the generative ML model that includes the image, the event theme, and potentially other information and/or structuring.

Example Prompt: Insert the human from the attached image into a scene. Thanksgiving, holiday, festive, food, indoors, turkey, pie, cartoon style.

In one implementation, the systems described herein may store one or more prompts related to each available event theme. For example, the systems described herein may store a prompt that expects a single image of the user, a prompt that expects an image of the user and another image of a family member, friend, or pet, a prompt that produces realistic output, a prompt that produces cartoonified output, and so forth.

Example Halloween Prompts:
Fantasy example: Insert the person from the attached image into a scene. Halloween, spooky, black cats, pumpkins, bats, candy, costumes, outdoors, night, fantasy style.
Multiple subject example: Insert the person from the first image into the center of the scene. Insert the person from the second image into the scene. Halloween, spooky, black cats, pumpkins, bats, candy, costumes, outdoors, night, fantasy style.
Photorealistic example: Insert the person from the attached image into a scene. Halloween, outdoors, street, costumes, costumed children, families, night, photorealistic, photograph style.

Example Christmas Prompts:
Cartoon example: Insert the person from the attached image into a scene. Christmas, holiday, wreaths, food, green and red, bells, wrapped presents, Christmas tree, decorated tree, indoors, cartoon style.
Multiple subject example: Insert all people from the attached image into a scene. Christmas, holiday, wreaths, food, green and red, bells, wrapped presents, Christmas tree, decorated tree, indoors, cartoon style. photograph style.

In some implementations, the systems described herein may store one or more prewritten prompts into which additional text can be inserted to further personalize the resulting image. For example, a stored prompt may include placeholder data with special formatting that enables the method to replace the placeholder data with personalized data.

Example Prompt: Insert the person from the attached image into a scene. Halloween, person wearing [custom costume] costume, person dressed as a [custom costume], spooky, black cats, pumpkins, bats, candy, outdoors, night, fantasy style.

In some implementations, the generative ML model can be trained using labeled images to enable the creation of complex scenes using textual descriptions included in the above prompts. In some implementations, the generative ML model can optionally be fine-tuned using examples of greeting cards in various styles. In some implementations, the generative ML model can also be fine-tuned using event or holiday images or similar images.

In some implementations, the processor may directly execute a generative ML model. For example, a client device or a server may be configured with both the processor and an instance of the generative ML model. Alternatively, the processor may communicate with an externally hosted generative ML model via an application programming interface (API) or other method. In one implementation, the processor may select an appropriate generative ML model based on the desired style of greeting card. For example, the processor may select a different model to generate a cartoon greeting card than a realistic greeting card based on the relative strengths of each model.

In some examples, the method may provide more than one image to the generative ML model. For example, the method may provide additional images of the user, images of the users' friends or family, and/or images of the user's pet(s). In one implementation, the systems described herein may automatically search through images linked to the user's account for relevant images. Additionally, or alternatively, the systems described herein may prompt the user to provide relevant images (e.g., by uploading an image, selecting an image from a gallery, etc.).

In some implementations, the systems described herein may include additional personalization in the greeting card. For example, the systems described herein may identify one or more contacts of the user to whom the card is likely to be sent. In some implementations, the systems described herein may identify likely recipients as manually selected by the user, because the contacts are part of message chains related to the event theme, based on previous greeting cards sent to those contacts, and the like. In some examples, the systems described herein may include details about those contacts in the generated image such as the contacts' names, images, imagery related to the contacts' shared interests with the user, etc. For example, the systems described herein may add images of the contacts and/or details about the contacts to the prompt provided to the generative ML model. In one example, the systems described herein may customize a soccer-related greeting card with jerseys and/or other details for the contact's favorite team.

Example Prompt: Insert the person from the attached image into a scene. Soccer, soccer players in green and white jerseys, green and white scoreboard, soccer ball, goals, field, outdoors, photorealistic, photography style.

Figure 4:
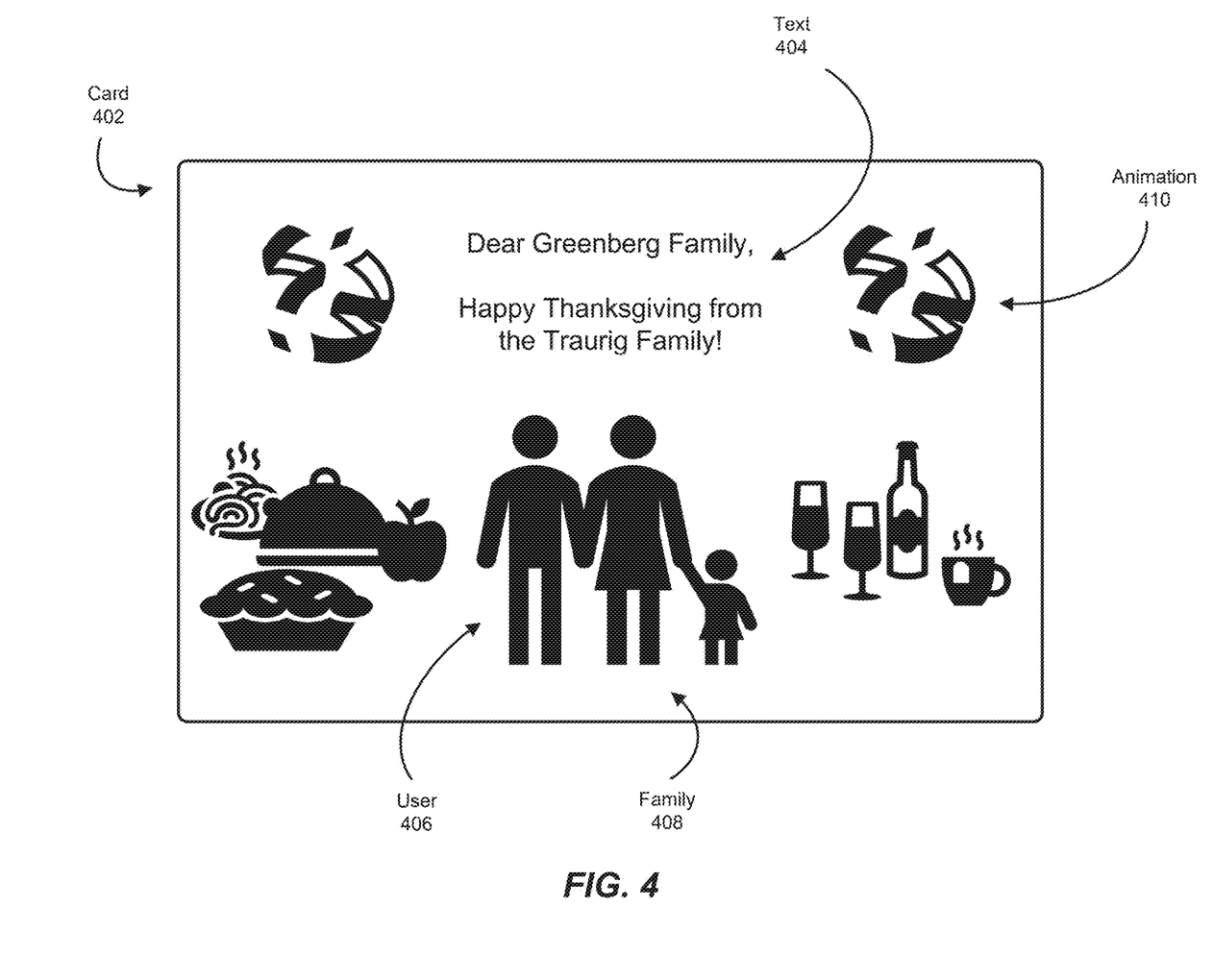
FIG. 4 is an illustration of an example programmatically generated custom greeting card according to some of the example embodiments.

In one example, as illustrated in FIG. 4, the systems described herein may generate a card 402 that may include text 404 that includes a holiday greeting that references the user's name and an expected recipient's name. In addition, card 402 may include a depiction of user 406 and/or family 408 of the user (e.g., based on one or more images retrieved by the systems described herein and provided to the generative ML model), as well as various event-theme-related imagery. In some examples, card 402 may include an animated element, such as animation 410 of exploding ribbons. Additionally, or alternatively, the systems described herein may provide card 402 as input to a video generation model that outputs a video version of card 402 with various animated elements such as user 406 and/or family 408 waving, dancing, and/or performing other animated actions. In some implementations, the systems described herein may transform the depiction of the user and/or other individuals in the card according to theme. For example, the generative ML model may output a version of card 402 with user 406 and/or family 408 dressed in holiday costumes (e.g., a turkey costume for Thanksgiving, a Santa costume for Christmas, etc.) and/or as well-known characters (e.g., superheroes). In one implementation, the systems described herein may include an audio generation module that generates audio to accompany card 402, such as a text-to-speech reading of a greeting that matches the event theme, sound effects that match objects within the card (e.g., cooking food sizzling, fireworks exploding, cats meowing, etc.), and/or music generated by a music generation module.

In some implementations, the systems described herein may enable a user to make changes to the generated image. For example, the systems described herein may enable a user to edit the generated image directly via various image-editing tools. In another example, the systems described herein may enable a user to provide input on a modified prompt that the processor inputs to the generative ML model to generate an updated image. In some implementations, the systems described herein may include a chat dialogue that enables the user to provide text-based input that is transformed by the systems described herein into a prompt for the generative ML model. In one implementation, the systems described herein may use an LLM to transform user input into a prompt for the generative ML model. Additionally, or alternatively, the systems described herein may analyze user input for keywords to apply to a prompt for the generative ML model.

Example initial prompt: Insert the person from the attached image into a scene. Halloween, spooky, black cats, pumpkins, bats, candy, costumes, outdoors, night, fantasy style.

Example initial image: A fantasy-style image of a woman on the street at night surrounded by costumed children with baskets of candy with bats overhead and black cats on the street.

Example user input: I want to be wearing a sailor costume. Get rid of the black cats and bats. Make the image realistic.

Example LLM-generated prompt: Insert the person from the attached image into a scene. Halloween, woman wearing a sailor costume, female sailor, spooky, pumpkins, candy, costumes, outdoors, night, photorealistic, photograph style—cats—kittens—bats—animals Example updated image: A photograph-style image of a woman in a sailor costume on the street at night surrounded by costumed children with baskets of candy.

In some implementations, the systems described herein may include safeguards against generating offensive content, especially in scenarios where a user provides direct input for the prompt. For example, the systems described herein may screen for and remove potentially offensive keywords. Additionally, or alternatively, the systems described herein may include negative prompting that minimizes or eliminates the occurrence of offensive visual elements in generated images.

Returning to FIG. 2, in step 208, the method can include transmitting, by the processor, the generated image to one or more digital contacts of the user via the digital messaging application.

In some implementations, the method may suggest digital contacts to the user. For example, if the event theme is an annual holiday, the method may identify recipients of previous cards for the same holiday and suggest these recipients. In another example, if the event theme is an activity and the user has recent message history with one or more contacts regarding this activity, the method may suggest these contacts. Additionally, or alternatively, the systems described herein may receive identifiers of one or more digital contacts from the user.

The systems described herein may transmit the generated image in a variety of ways. For example, the systems described herein may embed the image in an electronic message such as an email. Additionally, or alternatively, the systems described herein may include the image as an attachment to an electronic message. In one example, the systems described herein may post the image on a social media platform.

In some embodiments, the systems described herein may solicit and/or suggest potential recipients before creating the greeting card and may automatically email the greeting card to the recipients. Alternatively, the systems described herein may generate a greeting card and then receive and/or generate a list of recipients. In some implementations, the systems described herein may receive input from a user approving the greeting card and/or recipient list and may send the greeting card to the recipient list in response to receiving the user input.

In some implementations, the above embodiments can be extended to allow for the creation of new images without a user image. For example, many mail applications allow for the use of "stationary" which comprises images, styles, and other content added to the content of an email to provide a theme for the message. Currently, this stationary must be created manually. However, using the above techniques, a prompt can be generated and inserted into one or both of a text-based LLM and generative ML model. For example, a user may wish to create stationary to celebrate the (fictional) holiday of "Festivus." Existing mail applications may not have such stationary given the fictional nature of the holiday. Thus, in some implementations, the user can provide information about the holiday (e.g., "humorous," "Seinfeld," "aluminum pole," "feats of strength," "airing of grievances," etc.) which can be used to build a prompt ("Generate a series of images using the following topics: <topics>") to generate images for use in the stationary. Further, an LLM can be used to generate the underlying stationary code (e.g., Hypertext Markup Language, Cascading Style Sheets, etc.) using preferences of the user (e.g., colors, style, etc.) or provided text (e.g., "A Festivus for the Rest of Us"). As in the preceding example, the system can generate a sample message using the stationary and allow the user to modify the stationary using natural language commands (e.g., "move the aluminum pole to the right").

Figure 5:
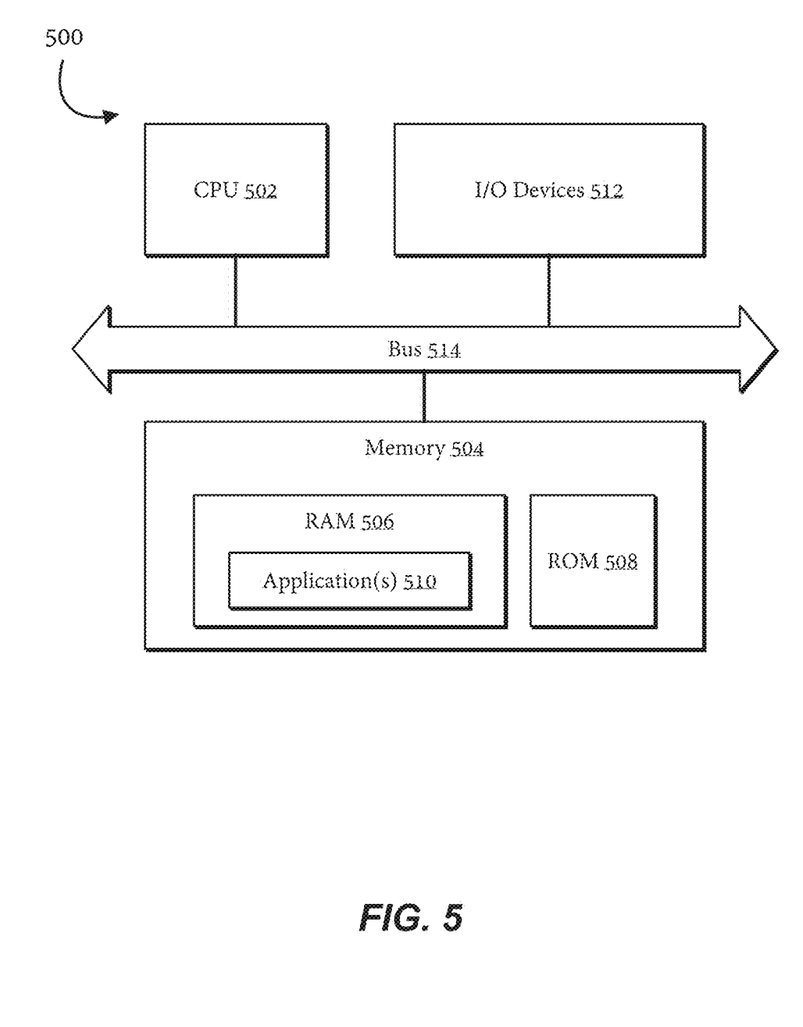
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:
   receiving, by a processor that executes a digital messaging application, an image that comprises a depiction of a user;
   selecting, by the processor, an event theme based on at least one of a current date and content currently being provided by the digital messaging application;
   obtaining, by the processor, at least one additional image associated with the event theme;
   creating, by a generative machine learning model, a generated image that comprises the depiction of the user and the event theme, wherein the generative machine learning model synthesizes a single greeting card image by combining the received image comprising the depiction of the user with the at least one additional image associated with the event theme according to preset template information that defines at least one of layout information and theme information for greeting cards; and
   transmitting, by the processor, the generated image to one or more digital contacts of the user via the digital messaging application.

2. The method of claim 1, wherein selecting the event theme comprises:
   presenting the user with a predetermined list of event themes; and
   receiving a selection from the predetermined list of event themes from the user.

3. The method of claim 1, wherein selecting the event theme comprises:
   identifying an activity history of the user, and
   determining the event theme based on the activity history of the user.

4. The method of claim 1, wherein selecting the event theme comprises:
   identifying a geographic location of the user, and
   determining the event theme based at least in part on the geographic location of the user.

5. The method of claim 1, wherein selecting the event theme comprises:
   identifying, by the processor, a current date;
   determining, by the processor, an event in close temporal proximity to the current date; and
   selecting the event theme to match the event.

6. The method of claim 1, wherein the generated image comprises text that is relevant to the event theme.

7. The method of claim 6, wherein the text comprises a seasonal greeting.

8. The method of claim 1, wherein creating, by the generative machine learning model, the generated image comprises:
   retrieving at least one detail relevant to the one or more digital contacts; and
   creating the generated image based at least in part on the at least one detail.

9. The method of claim 1, creating, by the generative machine learning model, the generated image comprises:
automatically retrieving at least one additional image associated with the user that is stored in a user account associated with the digital messaging application; and
creating the generated image based on the image that comprises the depiction of the user, the event theme, and the at least one additional image associated with the user.

10. The method of claim 1, creating, by the generative machine learning model, the generated image comprises transmitting instructions by the processor to the generative machine learning model via an application programming interface.

11. The method of claim 1, wherein receiving, by the processor that executes the digital messaging application, the image that comprises the depiction of the user comprises:
causing display of a user interface element within a user interface of the digital messaging application that prompts the user to create an event-themed image; and
receiving the image that comprises the depiction of the user via the user interacting with the user interface element.

12. A non-transitory computer-readable storage medium for tangibly storing computer program instructions capable of being executed by a computer processor, the computer program instructions defining steps of:
receiving, by a processor that executes a digital messaging application, an image that comprises a depiction of a user;
selecting, by the processor, an event theme based on at least one of a current date and content currently being provided by the digital messaging application;
obtaining, by the processor, at least one additional image associated with the event theme;
creating, by a generative machine learning model, a generated image that comprises the depiction of the user and the event theme, wherein the generative machine learning model synthesizes a single greeting card image by combining the received image comprising the depiction of the user with the at least one additional image associated with the event theme according to preset template information that defines at least one of layout information and theme information for greeting cards; and
transmitting, by the processor, the generated image to one or more digital contacts of the user via the digital messaging application.

13. The non-transitory computer-readable storage medium of claim 12, wherein selecting the event theme comprises:
presenting the user with a predetermined list of event themes; and
receiving a selection from the predetermined list of event themes from the user.

14. The non-transitory computer-readable storage medium of claim 12, wherein selecting the event theme comprises:
identifying an activity history of the user; and
determining the event theme based on the activity history of the user.

15. The non-transitory computer-readable storage medium of claim 12, wherein selecting the event theme comprises:
identifying a geographic location of the user; and
determining the event theme based at least in part on the geographic location of the user.

16. The non-transitory computer-readable storage medium of claim 12, wherein selecting the event theme comprises:
identifying, by the processor, a current date;
determining, by the processor, an event in close temporal proximity to the current date; and
selecting the event theme to match the event.

17. The non-transitory computer-readable storage medium of claim 12, wherein the generated image comprises text that is relevant to the event theme.

18. The non-transitory computer-readable storage medium of claim 17, wherein the text comprises a seasonal greeting.

19. The non-transitory computer-readable storage medium of claim 12, wherein creating, by the generative machine learning model, the generated image comprises:
retrieving at least one detail relevant to the one or more digital contacts; and
creating the generated image based at least in part on the at least one detail.

20. A device comprising:
a processor; and
a storage medium for tangibly storing thereon logic for execution by the processor, the logic comprising instructions for:
receiving, by the processor that executes a digital messaging application, an image that comprises a depiction of a user;
selecting, by the processor, an event theme based on at least one of a current date and content currently being provided by the digital messaging application;
obtaining, by the processor, at least one additional image associated with the event theme;
creating, by a generative machine learning model, a generated image that comprises the depiction of the user and the event theme, wherein the generative machine learning model synthesizes a single greeting card image by combining the received image comprising the depiction of the user with the at least one additional image associated with the event theme according to preset template information that defines at least one of layout information and theme information for greeting cards; and
transmitting, by the processor, the generated image to one or more digital contacts of the user via the digital messaging application.

* * * * *